United States Patent
Nalbantis et al.

(10) Patent No.: US 8,326,340 B2
(45) Date of Patent: Dec. 4, 2012

(54) TRANSMIT POWER CONTROLLER

(75) Inventors: Dimitris Nalbantis, West Malling (GB); Christopher Geraint Jones, West Malling (GB); Bernard Mark Tenbroek, West Malling (GB)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 1048 days.

(21) Appl. No.: 12/275,973

(22) Filed: Nov. 21, 2008

(65) Prior Publication Data

US 2009/0196223 A1 Aug. 6, 2009

Related U.S. Application Data

(60) Provisional application No. 61/024,977, filed on Jan. 31, 2008.

(51) Int. Cl.
*H04B 1/04* (2006.01)
*H04B 1/06* (2006.01)
*H01Q 11/12* (2006.01)
*H03C 1/62* (2006.01)

(52) U.S. Cl. ............... 455/522; 455/114.3; 455/115.1; 455/127.1; 455/232.1; 455/234.1

(58) Field of Classification Search .............. 455/522, 455/114.3, 127.1, 115.1, 232.1, 234.1
See application file for complete search history.

(56) References Cited

U.S. PATENT DOCUMENTS

| | | | | |
|---|---|---|---|---|
| 5,030,898 A | * | 7/1991 | Hokanson et al. | 318/146 |
| 5,485,486 A | * | 1/1996 | Gilhousen et al. | 370/335 |
| 6,108,364 A | * | 8/2000 | Weaver et al. | 375/130 |
| 6,252,507 B1 | * | 6/2001 | Gagnon | 340/552 |
| 6,836,647 B2 | | 12/2004 | Rimini | |
| 6,959,178 B2 | * | 10/2005 | Macedo et al. | 455/313 |
| 7,164,313 B2 | * | 1/2007 | Capofreddi et al. | 330/86 |
| 7,239,856 B2 | * | 7/2007 | Ahn et al. | 455/127.2 |
| 7,684,760 B2 | * | 3/2010 | Kwak | 455/69 |
| 8,014,735 B2 | * | 9/2011 | Vinayak et al. | 455/114.3 |
| 2003/0068991 A1 | | 4/2003 | Lee | |
| 2003/0199259 A1 | * | 10/2003 | Macedo et al. | 455/141 |
| 2004/0192236 A1 | | 9/2004 | Yang | |
| 2007/0297537 A1 | * | 12/2007 | Luce | 375/322 |
| 2008/0139146 A1 | * | 6/2008 | Behzad | 455/127.2 |
| 2009/0117865 A1 | * | 5/2009 | Vinayak et al. | 455/127.1 |

FOREIGN PATENT DOCUMENTS

CN 1411312 A 4/2003

* cited by examiner

*Primary Examiner* — Bobbak Safaipour
(74) *Attorney, Agent, or Firm* — Winston Hsu; Scott Margo (57) ABSTRACT

A transmit power control system includes: an output power estimator for estimating a transmit power of a transmitter; and a transmit power controller responsive to the output power estimator and to compare this with a requested power in order to calculate a target power which takes account of errors within the transmit power control system, and to vary a gain of an amplifier in a transmit signal path so as to reduce an error between the transmit power of the amplifier and the requested power.

19 Claims, 6 Drawing Sheets

TRANSMIT POWER CONTROLLER

RELATED APPLICATIONS

This application claims priority to U.S. Provisional Patent Application No. 61/024,977, titled "A TRANSMIT POWER CONTROLLER", filed on Jan. 31, 2008. The contents of the above application are incorporated herein by reference.

FIELD OF THE INVENTION

The present invention relates to a transmit power controller for use in a mobile telecommunications device.

BACKGROUND OF THE INVENTION

The transmitter power control specifications for code division multiple access (CDMA) data and telephony systems, such as 3GPP, WCDMA and CDMA 2000 impose tough requirements for the operation of these "3G" handsets. In general a base station communicating with a plurality of handsets within a cell needs all the signals arriving at the base station to have substantially the same power level. If this is not the case, then those signals with greater intensity become on-channel interferers for those signals of reduced intensity and eventually could cause the cell to cease operation.

In general the gain of the transmitter in a mobile device, such as a handset and data card, varies with transmit frequency, ambient and die temperature, supply voltage and fabrication process tolerances. However the "3G" standards require that the mobile unit should be able to change its output power in predetermined step sizes in response to instructions from the base station. Typically the mobile handsets are expected to be able to make 1 dB changes in output power with a 0.5 dB accuracy, and 10 dB step changes in power with a 2 dB accuracy. Furthermore the absolute maximum power transmitted by the base station should be controllable to within 2 dB.

In order to achieve the specified step sizes over the required dynamic range, manufacturers have generally used one or other (or a combination) of two techniques. In a first approach the handset is extensively calibrated during production testing in order to characterize its response over at least frequency, and optionally battery voltage. Calibration over temperature is generally avoided as this is time consuming. A second approach is to use a power detector during the normal transmit operation. The power detector is generally in the form of a logarithmic amplifier or received signal strength indicator, which generally takes hundreds of microseconds to take a measurement. This prevents the detector from being used on a slot-by-slot basis within the handset in order to control the transmit power within a slot and therefore the calibration data is combined with occasional use of a detector at high transmit power levels to prevent the handset from exceeding the maximum transmit power allowed by the relevant 3G standard. It should be noted that the CDMA signal looks like noise, so generally a relatively long integration time is required for these detectors in order to achieve a reliable power measurement. Each WCDMA slot lasts around 670 microseconds with around 1500 power correction commands being received by a mobile telephone from the base station every second.

SUMMARY OF THE INVENTION

According to a first aspect of the present invention there is provided a transmit power control system, comprising: an output power estimator for estimating a transmit power of a transmitter; and a transmit power controller responsive to the output power estimator and arranged to compare this with a requested power in order to calculate a target power which takes account of errors within the transmit power control system, and to vary a gain of an amplifier in a transmit signal path so as to reduce an error between the transmit power of the amplifier and the requested power.

It is thus possible to provide a much faster control of the transmitted output power by estimating the gain of the transmitter stage and using a priori knowledge of the signal input power which is available from a digital baseband processor of a mobile device, such as a mobile telephone, to form an estimate of transmitted signal power. The estimate of signal power is used to inform the decisions of a control loop provided locally within the mobile telephony device. In this way, accurate power control can be provided dynamically on a slot-by-slot basis thus eliminating the need for lengthy phone calibration during production testing.

Advantageously the power estimator compares a signal or a portion thereof, at the output of the amplifier and down-converted with a signal input to the amplifier or with a baseband signal. It should be noted that the amplifier may be formed by several amplifier stages, such as small signal amplifiers and power amplifiers, and that steps such as frequency up-conversion may occur between amplifier stages. The comparison can conveniently be performed using the analog baseband signal and the down-converted output of the amplifier and from this amplifier gain can be deduced. In a preferred embodiment the RMS power net of DC offset is measured for each of the signals being compared. The result is then converted to absolute power using knowledge about the absolute power level of the baseband signal and loss in the measured signal path from the antenna to the detector input.

A delay system may be provided in order to bring the signal presented at the input of the amplifier into sufficient time alignment with the signal occurring at the output of the amplifier for the gain comparison to be performed. The comparison may be done by comparing a baseband signal prior to up-conversion and amplification with a demodulated portion of the signal sent to the antenna.

Within the data and control system for a 3G mobile telephony device, the processors maintain a measurement of the long-term average signal power to the amplifier, albeit normalized with respect to digital full-scale of the digital to analog converters within the mobile device, and consequently this estimate of long-term average power can be combined with an estimate of amplifier gain and a further single parameter derived during room-temperature laboratory characterization in order to allow the actual signal power at the output of the amplifier to be calculated. The parameter may be provided on a band by band basis for enhanced performance.

Advantageously the transmit power controller and/or estimator of the present invention is only run for a short time at the start of each transmission slot and radio transmitter power corrections are calculated at the target power level required for the slot. These corrections are then applied immediately the transmission commences for each slot. In a preferred embodiment the controller is only powered for approximately 25 to 50 microseconds of each 670 microsecond slot within the transmission scheme.

According to a second aspect of the invention there is provided a method of controlling the transmit power of a mobile device operating in a CDMA or WCDMA mode, the method comprising the steps of: comparing time aligned versions of a baseband or intermediate signal with a down-converted portion of the transmitted signal so as to form an estimate of transmitted power, and using this estimate to adjust the transmitted power towards a target value within a power switching period of the CDMA or WCDMA slot.

BRIEF DESCRIPTION OF THE DRAWINGS

The present invention will further be described, by way of non-limiting example only, with reference to the accompanying Figures, in which.

DESCRIPTION OF PREFERRED EMBODIMENTS OF THE INVENTION

Figure 1:
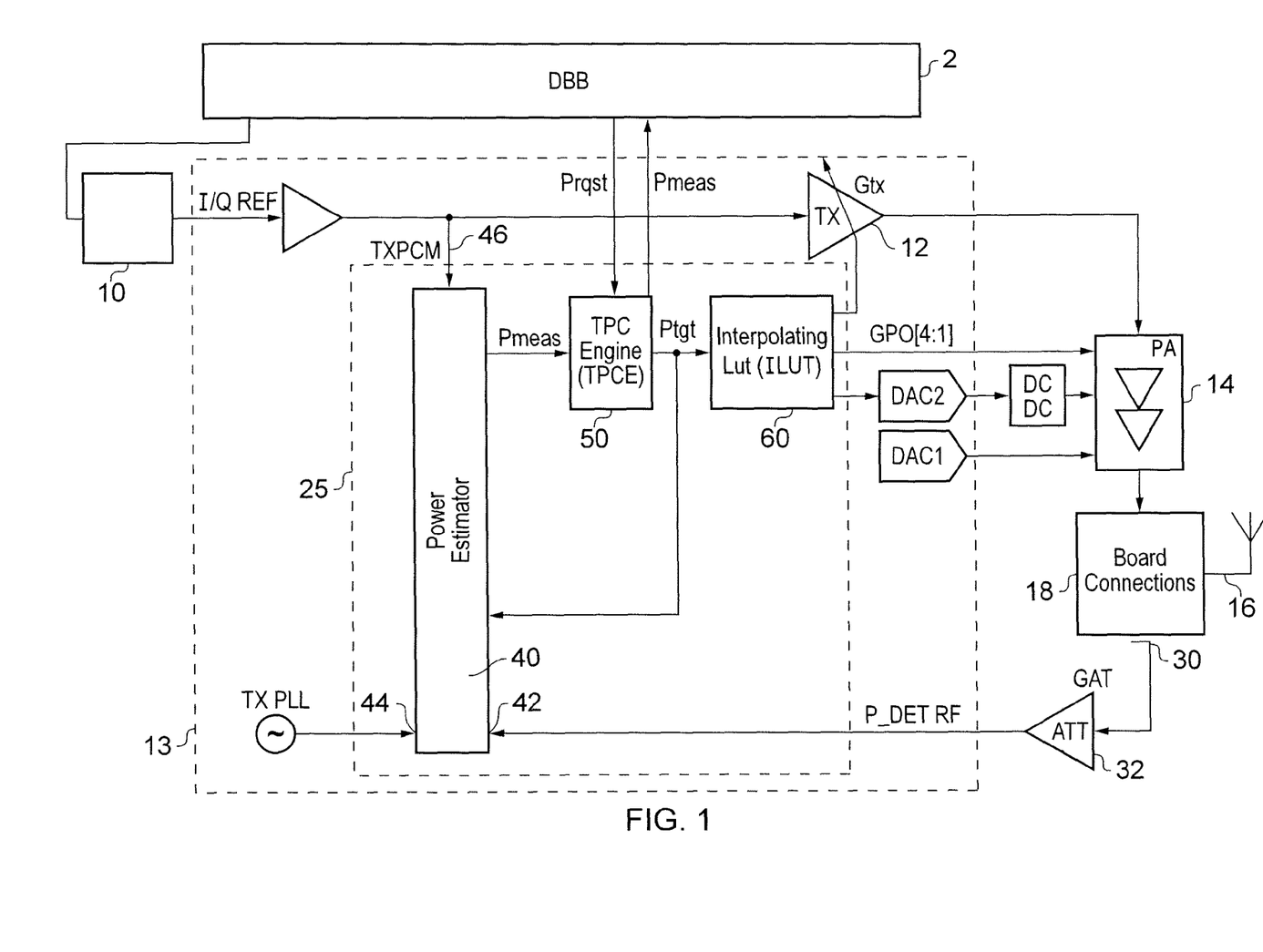
FIG. 1 is a schematic diagram of a transmitter portion of a mobile telephony device operating in accordance with one of the CDMA standards and constituting an embodiment of the present invention.

FIG. 1 schematically illustrates a simplified block diagram of the transmit portion of a mobile device such as a mobile telephone constituting an embodiment of the invention. The signal to be transmitted, whether that be speech or data, has already been encoded and spread by multiplication with a spreading code used by the mobile device in a digital baseband processing portion 2, of the mobile device prior to being provided to an analog baseband processing system 10. Such a circuit configuration is well known to the person skilled in the art. The output (which comprises an in-phase signal and a quadrature signal) is sent for up-conversion within a RF transmitter portion, generally designated 12 which outputs the signal that is to be transmitted, albeit with insufficient power for transmission. The RF transmitter 12 is known to the person skilled in the art and is for simplicity schematically represented as a variable gain amplifier. The RF transmitter 12 is provided on a monolithically integrated circuit 13—along with many other core components of the mobile telephony device. The RF signal from the RF transmitter 12 is provided to a power amplifier 14 which is generally provided as a separate component outside of the integrated circuit 13 which performs the up-conversion and first stage of amplification. The output of the power amplifier 14 is provided to an antenna 16 via intermediate components on a circuit board 18, which generally include a duplexer so as to allow the relatively powerful transmit signal to be provided to the antenna whilst simultaneously allowing the significantly weaker receive signal to be routed towards a receive circuit (not shown) within the mobile device.

The on-chip transmitter 12 operates as a small signal device and care is taken to optimize it for linearity. Similarly, the off-chip power amplifier is also optimized for maximum linearity at the top-end of its operating range. A trade-off in achieving this linearity at or near maximum power is that to achieve this significant amounts of current are consumed. However, at lower output power levels the need for linearity diminishes and therefore the power amplifier current consumption can be reduced. As a consequence, at lower output power levels power amplifier designers tend to optimize the amplifier for current consumption rather than control linearity by offering a plurality of gain ranges. In this context, control linearity for a given gain range means that changes dPo (where "d" represents a small change) in the output power level Po always result in gain changes dGo such that the ratio dPo/dGo remains constant. In the prior art, a digital base band processor 2 has been tasked with controlling the gain of the on chip amplifier 12 and power amplifier 14 in response to control signals from the base station (not shown) with which the mobile device is communicating. The base station control, in which the base station provides signals indicating increase by one step or decrease by one step, remains a feature of the power control system. The co-operation between the base station and the mobile device can be regarded as a "system closed loop" for power control. However in embodiments of the present invention this is now working in combination with a "local loop" where a local measurement system and control system 25 monitors the power changes which have been made, and seeks to apply a correction within a time frame which is significantly shorter than the slot period used in the CDMA communication scheme.

In order to achieve this local loop, a directional coupler 30 and attenuator 32 are provided so as to tap off some of the signal downstream from the output of the power amplifier. The directional coupler and attenuator can be made sufficiently broadband such that their transfer characteristic is substantially invariant over the frequency range of the telephone, or similar mobile telecommunications device. An output of the attenuator is provided to a first input 42 of a power estimator 40 which also receives a copy of the transmit oscillator signal at a second input 44 such that the tapped off RF signal can be mixed with the transmit local oscillator signal in order to down convert the tapped off signal to baseband frequency. It can then be compared with a copy of the baseband signal provided at a third input 46 of the power estimator 40. The power estimator 40 is also responsive to a few other signals, as will be shown in greater detail in FIG. 2, which enables it to create an estimate of the output power at the output of the power amplifier 14. This estimate, designated "Pmeas" is provided to a transmit power control engine 50 (which functions as a transmit power controller) which compares the measured output power as estimated by the power estimator 40 with a requested output power received from the digital baseband processor 2 in order to calculate a target power "Ptgt" which takes account of discrepancies within the power control loop. The target power Ptgt is then provided as an input to a lookup table 60 which is used to lookup gain control settings for the transmitter 12 and for the power amplifier 14.

In a preferred embodiment of the present invention, the lookup table 60 is an interpolating lookup table 60 which, by conventional lookup tables standards used in the prior art, is small, and hence only has a very much reduced memory requirement. As a consequence it takes up little room and the data required to populate it can be obtained quickly. The lookup table will be described later with reference to FIG. 3.

Figure 2:
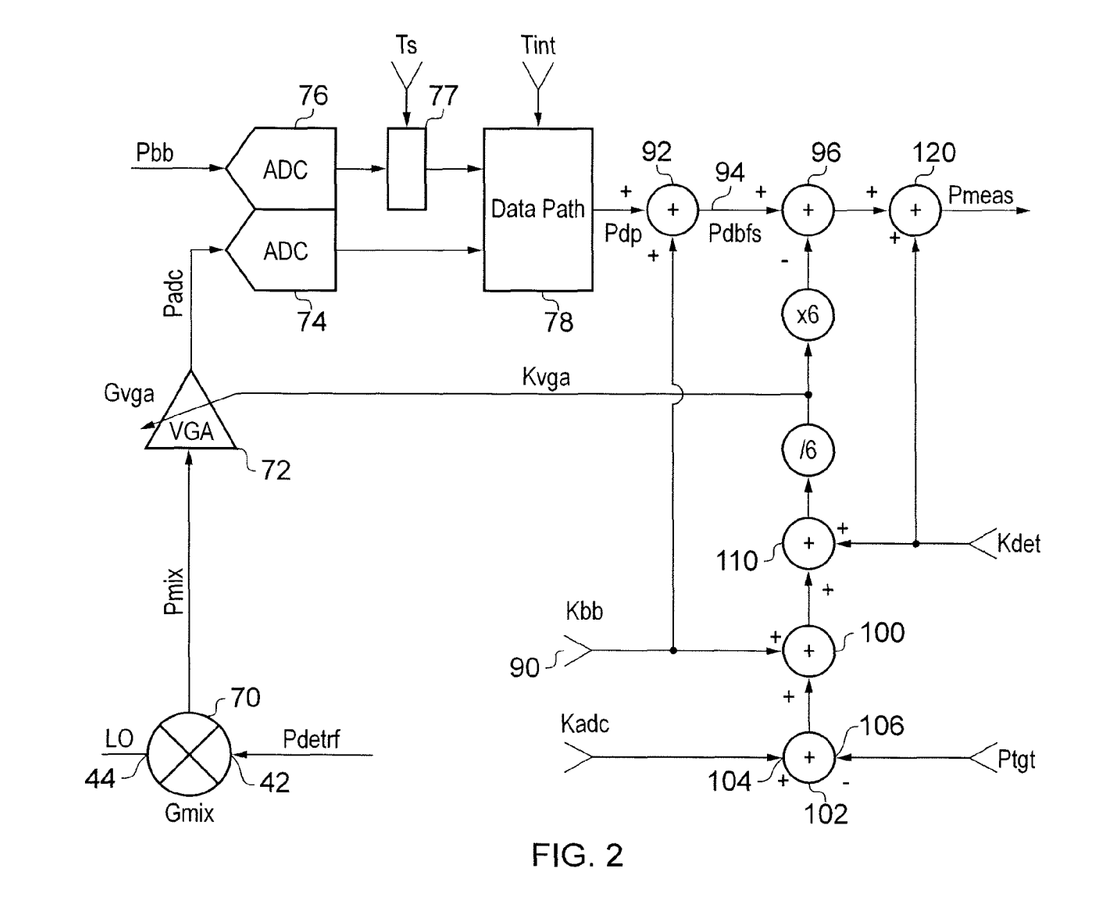
FIG. 2 is a schematic diagram of the components within the power estimator shown in FIG. 1.

FIG. 2 schematically illustrates the internal structure of an embodiment of the power detector 40 in greater detail. The detected RF signal "Pdetrf" which has been tapped off from the output of the power amplifier 14 via the directional coupler 30 is provided to a first input 42 of a mixer 70. The mixer receives the local oscillator signal "LO" (the same signal as used by the transmitter 12) at a second input 44 and hence outputs a down converted signal "Pmix" at the baseband frequency which represents the original baseband signal.

Naturally two mixers are provided, one to handle the in-phase channel and one to handle the quadrature channel. For convenience, the discussion will continue as if only one signal channel existed. The output of the mixer is then provided to a variable gain amplifier 72 which applies a variable gain "Gvga" to the signal Pmix to derive a signal labeled "Padc". The output of the variable gain amplifier 72 is provided to an analog to digital converter 74. A corresponding analog to digital converter 76 receives the baseband signal "Pbb" from the baseband processing system 10 and the output of the converter 76 is provided to a data path align circuit 77 the output of which, together with the output of converter 74 is provided to a data path compare circuit 78. The data path align circuit 77 uses a chain of clocked registers to provide a selectable delay "Ts" in order that the signal provided to the analog to digital converter 74 and that provided to the analog to digital converter 76 can be brought into approximate time alignment such that the signals can be compared, either by computing a ratio of their values or a difference. Either of these approaches gives information sufficient to enable a gain to be estimated. The comparison of the signals, for example to estimate their gain ratio "Pdp", preferably expressed in dB is performed by the align and compare circuit 78. The signal comparison is performed over an integration interval "Tint" during which the RMS power of each signal is calculated and DC offsets are removed before the signals are compared.

In a preferred embodiment (and as noted before) the output of the data compare circuit 78 is a ratio of the signal strengths, and most preferably expressed in decibels. By working in decibels the various gains of parts of the system can merely be summed together in order to provide a power measurement.

The variable gain amplifier 72 is provided in order to allow the signal amplitude at the input to the analog to digital converter 74 to be constrained, or rather adjusted, to lie within a relatively narrow band of amplitudes. This reduces the dynamic range requirements on the analog to digital converters 74 and 76, and hence enables these components to be more easily and more cheaply implemented. To put the operation of the variable gain amplifier in context, its task is to adjust (within limits) the amplitude at the input to the analog to digital converter 74. It can be seen that as the transmitted RF power decreases then the amplitude at the output of the mixer 70 also decreases. Therefore, the gain of the variable gain amplifier needs to be increased to maintain the signal at the input of ADC 74 within the required operating range. Conversely if the transmit power is increased then the gain of amplifier 72 is decreased.

The adjustment of VGA gain is performed automatically by the system using knowledge about the target output power as well as the radio system design. As noted before, the digital baseband processor 2 keeps a running total of the nature of the encoded signals and hence has a "long-term base band power average" measurement FIG. available, albeit on a normalized scale. This long-term base band power average, "Kbb", is provided to a third input 90 of the power estimator 40. The long-term baseband power average is also provided to a first summing input of a further summer 100 which receives an input from a further summer 102 which has a first input 104 which optionally receives an estimate of the target power "Kadc" to the analog to digital converter 74 and at a subtracting input 106 thereof receives the power target value "Ptgt" which, as will be explained later, is derived by the transmit power control engine 50. The output from the summer 100 is provided to a first summing input of a further summer 110 where it is added to a single measured gain parameter "Kdet" which is representative of the gain (which herein includes attenuation) in the detection path from the output of the power amplifier 14 to the input 42 of the power estimator. In this way the required VGA gain is derived automatically by the estimator.

In a preferred embodiment the variable gain amplifier 72 is digitally controlled with the gain changing in the step sizes of a given size. In a preferred embodiment the gain changes in steps of 6 dB. However, the actual step size will not be exactly 6 dB so every gain change introduces a small error. Since the variable gain amplifier 72 is preferably digitally controlled it may be more accurately referred to as a programmable gain amplifier—although it will be noted that the distinction, if any, is small.

The inventors have realized that if the change in the demanded transmit output power is only relatively small, say less than 1.2 dB (this value of a change threshold is used for example only and could be anywhere between 0 and 2 dB for example) then the variable gain amplifier should be inhibited from making a gain change midway through a power measurement and correction cycle. This removes a source of the step error which would occur if a gain change occurred. The gain change can be implemented after the power correction has been calculated or applied. The Kdet parameter may be measured for each power amplifier gain range of the power amplifier where the local loop is operative and it also inherently accounts for the selected full-scale level of the baseband signal path or deviations in the gain of the down-converter mixer 70 from its nominal gain.

An alternative, and equally viable approach, is to eliminate the variable gain amplifier (it may be replaced with a fixed gain amplifier) and accept that the measurement range is reduced and/or provide analog to digital converters with a greater dynamic range. It should be noted that although two analog to digital converters have been described in an alternative configuration one converter may be used in a time multiplexed manner.

In order to convert the output of the data compare circuit 78 into an absolute power measurement, the long-term baseband power average "Kbb" is added by a first summer 92 to the ratio of the reference and detected signals to produce an intermediate value at the output 94 of the summer 92 which represents the power of the transmitted signal relative to a full-scale value. This relative power Pdbfs is provided to a summing input of a second summer 96. The other input to the summer 96 is the VGA gain setting and after subtracting the latter from the former the output of the summer 96 is added to the Kdet gain detection path figure at a further summer 120 in order to provide an estimate of the amplifier power "Pmeas" at the output of the power amplifier. Thus the gain_detpath parameter allows the nominal output power with respect to full-scale output to be mapped onto an estimate of the output power at the output of the power amplifier.

The transmit power controller engine 50 receives a power request signal, Prqst, from the digital baseband processor 2 and the measured power estimate, Pmeas, and on the basis of these sets a target power provided to the look-up table 60. The transmit power control engine does more than merely seek to reduce the difference between the measured power and requested power because, as will be explained later, when operating at power significantly below the maximum transmit power, for example below a transmit power threshold, and where the power amplifier can be assumed to be approximately linear in its step size, then the local control loop involving the power detector 40 does not need to be active. Thus the power control can be regarded as operating in a "local open loop" even though the power control is operating within a system closed loop once the connection to the base station is taken into account. However when the signal amplitude rises sufficiently in order to operate the mixer 70 and hence bring the amplitude at the input to the analog to digital converter 74 to within a range sufficient for the power detector 40 to operate, then a local closed loop is established, which itself is still an inner loop when compared to the system closed loop involving the base station.

The transition between operating in a local open loop and operating in a local closed loop, i.e., a change in transmitted power across the transmit power threshold, could give rise to a gain error which the transmit power control engine 50 needs to estimate and accommodate for when entering local closed loop mode.

The transmit power control engine 50 compares the requested power and the measured power, and takes account of any known low power local open loop power error, and uses this to modify a power target value which is provided to the lookup table 60.

Figure 3A:
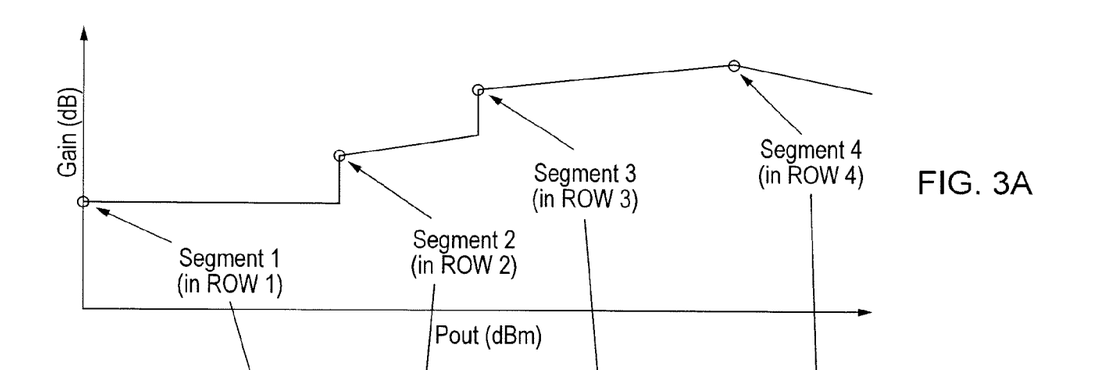
FIGS. 3a and 3b schematically illustrate the internal data structure of the interpolating look-up table of FIG. 1.
Figure 3B:
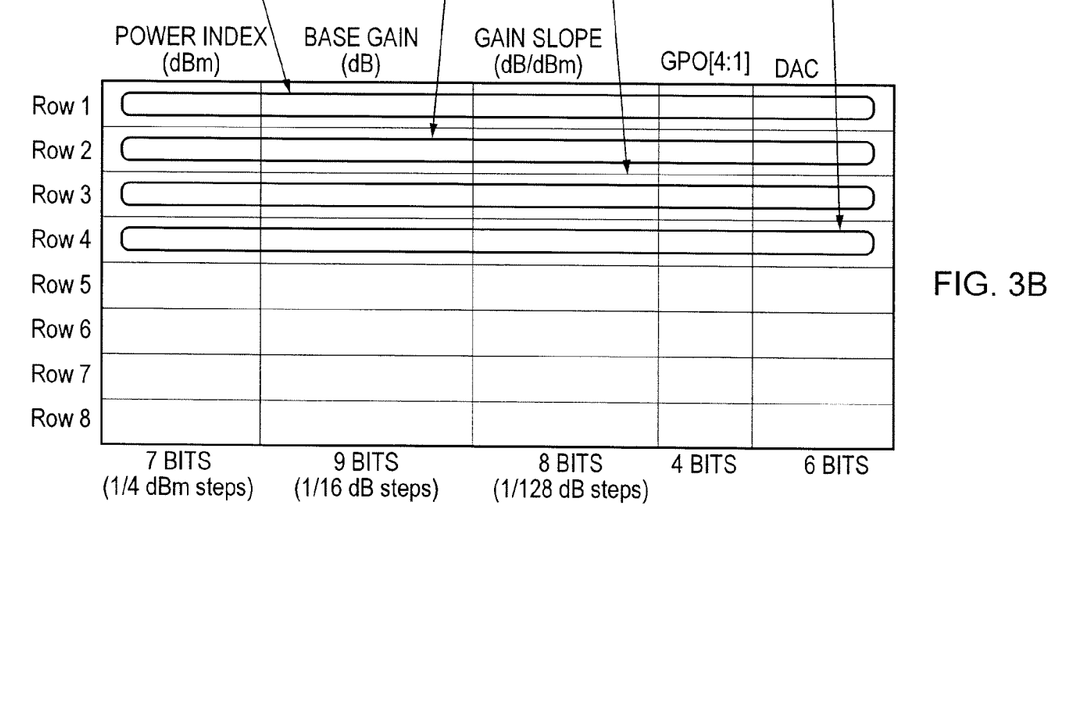

The interpolating lookup table may be segmented into various sub-ranges as shown in FIGS. 3a and 3b. Specifically, as shown in FIG. 3a the gain of the power amplifier 14 may be characterized with respect to the amplifier output by subdividing the amplifier characteristic into a plurality of segments, each segment covering a specific power output range and defined by a starting value and the slope such that the gain at any intermediate point in the table can be estimated. It will be seen that, within FIG. 3, the gain ranges are not contiguous but instead they differ by fixed gain steps. This is representative of actual amplifier performance where bias current and supply voltages to the amplifier can be switched in digital steps in order to change the amplifier's characteristics. Each of these individual steps effectively defines an operating range, which are represented by the characteristic loaded within the interpolating lookup table.

In this example, the interpolating lookup table as shown in FIG. 3b is subdivided into eight regions, labeled row 1 to row 8, each of which has a first field defining the lowermost power index, i.e., desired output power, that that portion of the table is applicable to, a second field defining a base gain which represents the power amplifier gain when the output power is equal to the power index, a third field defining the rate of change in gain with respect to output power, that is the gradient of the particular portion of the power amplifier gain graph, and then two control fields labeled GPO and DAC, both of which relate to parameters that control the operation of the power amplifier, such as the bias current, and supply voltage across the power amplifier, respectively.

In a preferred embodiment, the amount of data held in the lookup table is relatively modest as each row in the example of FIG. 3b only comprises 32 bits and only eight rows are required.

The look up table can be adapted to accept a further input, namely the long term baseband power average Kbb, such that the desired output power can be selected as a function of the baseband power and the amplifier gain.

In some situations where a DC-DC converter is used to control the PA gain switching and the DC-DC converter control is implemented in the ILUT through the GPO or DAC settings it is necessary for the power control system to allow for additional time before a measurement is taken to account for the settling of the DC-DC converter. To achieve this the power control system detects changes on the active DAC or GPO settings in the lookup table and suspends its sequence of operations for a preset amount of time for the DC-DC to settle. This delay can be programmable. Furthermore, to prevent the TX amplifier from transmitting at a random level during the settling period the controller may switch off the transmitter during the settling period.

Figure 4:
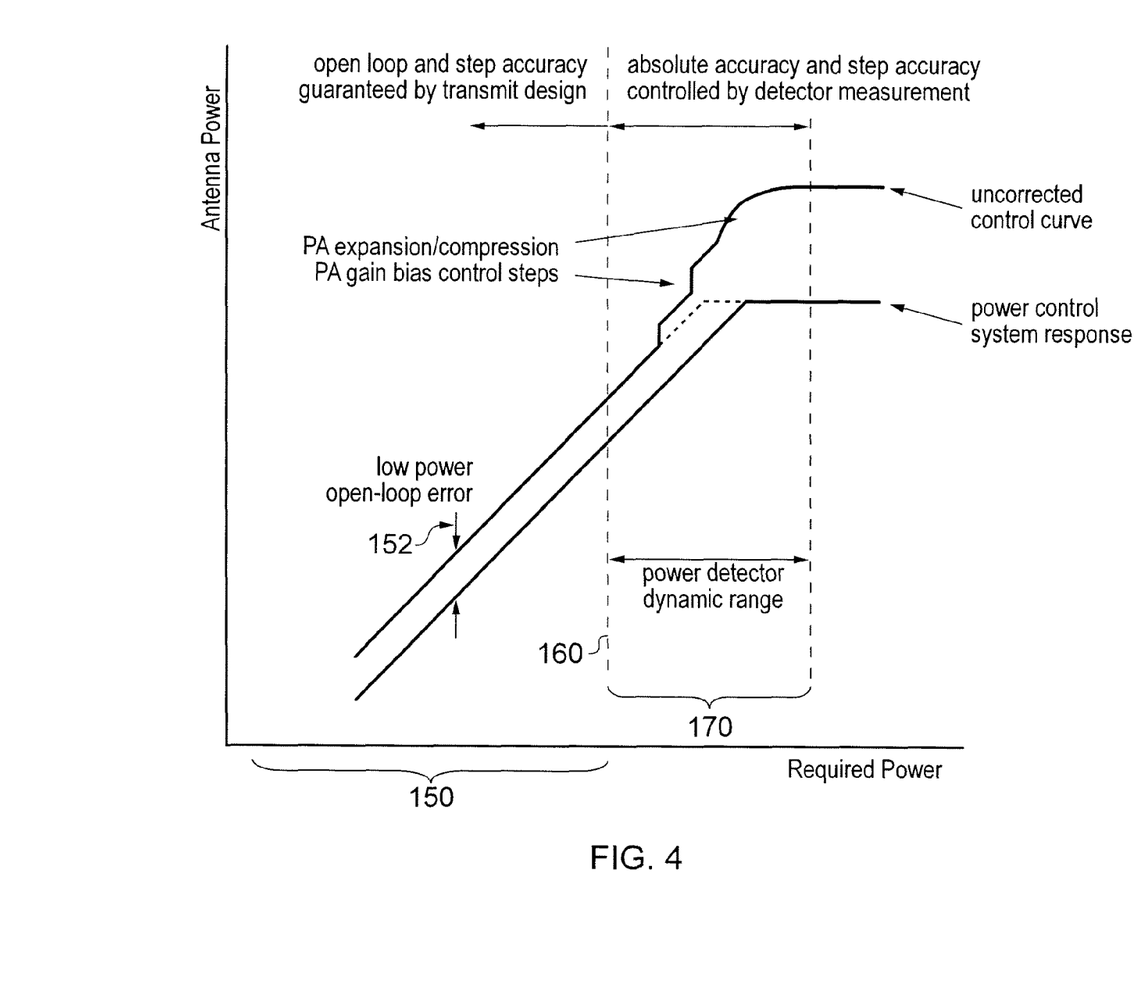
FIG. 4 is a graph showing power output versus requested power comparing the response of a uncorrected power amplifier, and a mobile device operating in accordance with the present invention.

FIG. 4 schematically illustrates operation of the present invention. The required power plotted along the X axis (abscissa) of FIG. 4 is representative of the power demanded from the power amplifier by virtue of the gain settings thereto, whereas the antenna power shown on the Y axis (ordinate) represents the actual output power. The graph will, in practice, be quantized in one dB steps but for simplicity these have been smoothed out. In the lower power ranges of operation, as designated by region 150 the power amplifier is remarkably linear. Therefore the power output of the amplifier tracks the required power quite accurately, although a lower power local open loop error may exist, as designated by the region 152 in FIG. 4. The magnitude of this error cannot be measured within region 150 because, as shown, it lies outside the dynamic range of the power detector 40. The error does not matter because it is masked out by the system closed loop formed by the mobile device responding to power increase or power decrease instructions provided by the base station. However, as the required power increases the power will pass a lower threshold value 160 which can be regarded as a transmitted power threshold where the power detector can become active.

If the system closed loop power control, that is the closed loop involving the base station, requests a power change which results in the antenna power increasing from within region 150 to somewhere within the region 170 which represents the operational dynamic range of the power detector then the transmit power controller makes the power change in a two step process so as to accommodate any open loop power errors. Firstly, it sets the power for the next slot to an intermediate value corresponding to a value at or adjacent the lower threshold 160 such that the low power local open loop gain or power error 152 can be measured. It then carries this error forward as part of the power target calculation to ensure that once the local closed loop power control becomes active, that it does not suddenly force this error to be corrected thereby giving rise to a step change in the output power which would undermine the system closed loop operating between the base station and the handset. However once the power detector is operative, then "detected" versions of the transmitted data signal can be compared with the data signal from the baseband processing section 10 in order to enable an estimate of the amplifier gain to be made within a very short time period (typically a few microseconds), because comparison between the detected signal and the known transmitted signal enables the amplifier gain to be rapidly estimated, as opposed to having to spend a long time averaging a noise-like signal as is the case with the prior art.

The transmit power control engine 50 can also control settings for any auxiliary integrated blocks such as power amplifier digital to analog converters or gain controller, as these can all be used to control the output power. The signal amplitude at the antenna settles relatively quickly so the transmit power control engine 50 can have the power estimator 40 make a measurement of the output power very quickly after the commencement of a slot, and calculate a step size correction and pass this back to the interpolating lookup table 60 such that a further power amplifier gain correction can be made. When applying the final correction to the output power the look-up table can be prohibited from changing the active power amplifier gain and control settings to avoid introducing further power errors due to such a change.

Once the transmit power has been set up, the digital baseband processor 2 reads back the final measurement of the antenna power in order to calculate the next power request based on the next transmit power control command sent by the base station to the mobile device.

Similarly, when making a transition from the region 170 to the region 160 the transmit power controller engine 50 causes an intermediate step to be performed such that the low power local open-loop error 152 can be measured on the transition from the local feedback regime to the local open-loop regime.

The transmit power control engine can also act to limit the transmit power despite requests from the base station to further increase the transmit power. If the transmit power control engine 50 initiates power limiting, then a "limit flag" is set such that the digital baseband 2 can be informed that limiting has occurred. Limiting can also be activated at the lower end (minimum power) of the transmit power range.

The digital baseband processor 2 can interact with the transmit power controller either synchronously or asynchronously. In a synchronized mode, the digital baseband processor 2 produces each power request by reading back the measured power on the antenna from a previous power adjustment step and using it, together with the transmit power change command issued by the base station in order to calculate a new power target. In an asynchronous mode, the digital baseband processor 2 issues power change requests without reading the measured power from previous steps. Overall power control is still maintained because of the feedback from the base station.

Figure 5:
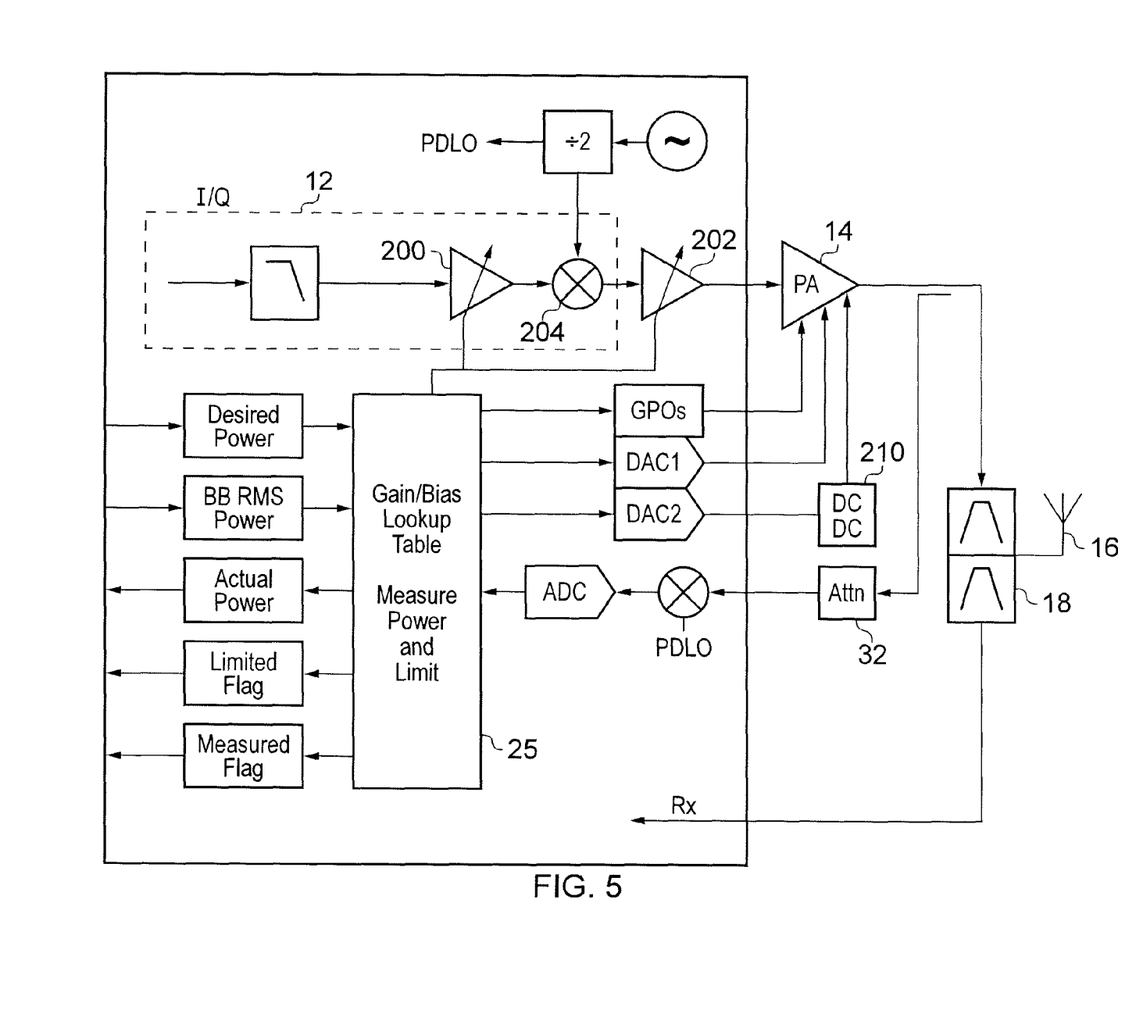
FIG. 5 is a schematic representation of similar to FIG. 1, but showing additional data flow paths.

FIG. 5 shows a preferred embodiment of the invention where the interpolating lookup table within the local measurement and control system 25 is adapted to control the gain of small signal amplifiers 200 and 202 provided before and after the mixer 204 of the up-converter 12. In this way, both the baseband and the RF gain of the radio transmitter can be adjusted using the power control system described here. The lookup table 60 also provides data to control GP0, DAC1, and DAC2 which all control the power amplifier gain, by setting the number of transistors that are active within the power amplifier, the bias currents in the power amplifier and the supply voltage across the amplifier, as provided by the DC-DC converter 210. The measurement and control system receives control data from the digital baseband processor (not shown) but also returns estimates of the actual transmit power, together with status flags so that the digital baseband processor can read an updated power estimate, and also know when limiting has occurred.

Figure 6:
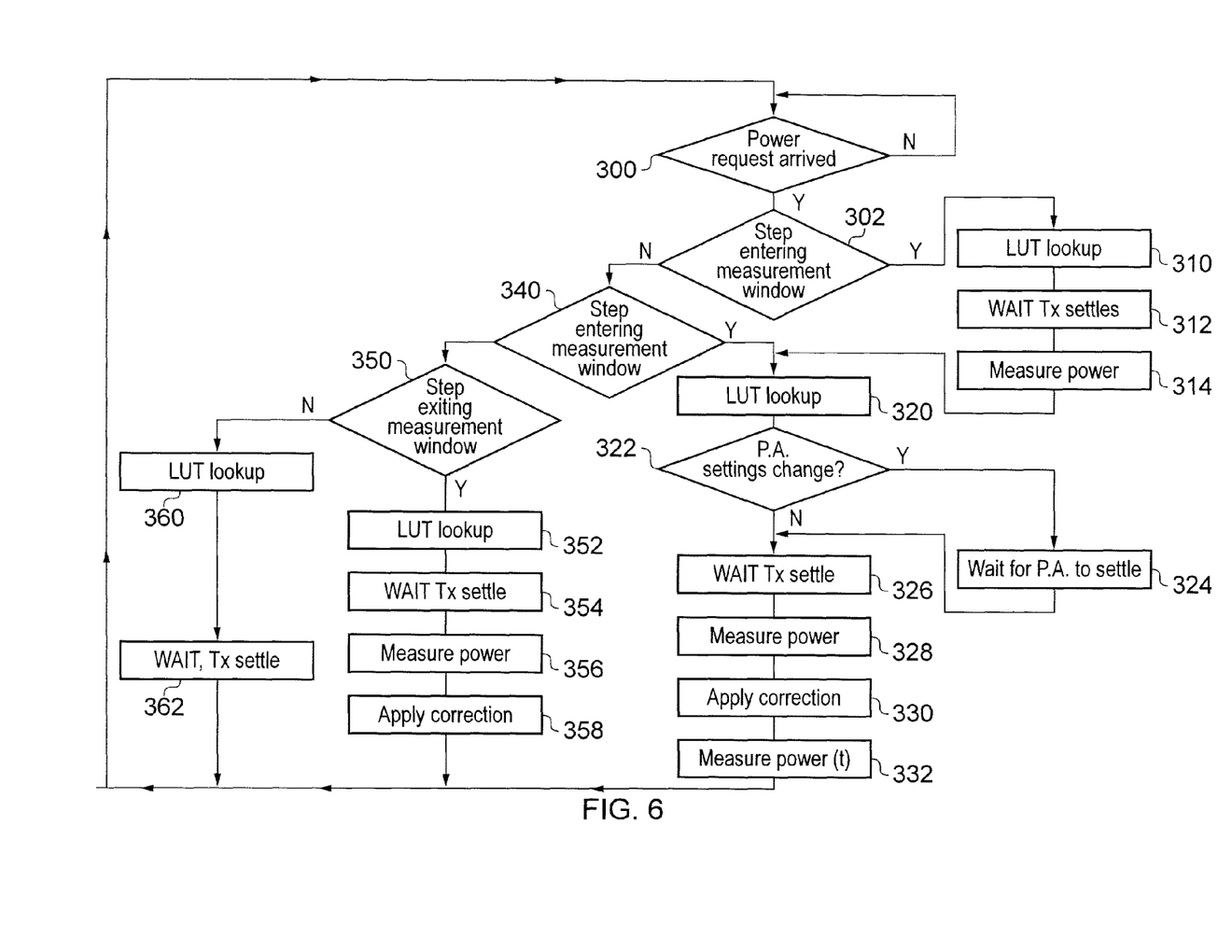
FIG. 6 is a flow diagram illustrating the operation of an embodiment of the present invention.

FIG. 6 is a flow diagram showing the operation of an embodiment of the invention in greater detail. The decision process starts at step 300 where a test is made to see if a request to vary the transmit power has occurred. If a request to vary the power has occurred then control passes to step 302, otherwise control loops back to step 300.

Step 302 checks to see if the requested change in power will cause a transition from region 150 of FIG. 4 to region 170 where the measurement window (and hence local closed loop power control) becomes active. If such a transition occurs then control is passed to step 310 where the amplifier parameters for the desired gain to give an intermediate output power are looked up from the interpolating look up table, ILUT, and applied to the amplifier. Control then passes to step 312 where a settling period is counted out before a measurement of transmit power is made at step 314. This represents setting power to an intermediate value as described above.

From step 314 control is passed to step 320 where the look up table is inspected for the demanded output power and amplifier parameters are retrieved from the look up table 60 and the amplifier operating parameters are applied to the power amplifier. Control then passes to step 322 where a test is made to see if the power amplifier bias and gain control settings have changed. In such a case, the settling time needed for external components such as DC-DC converters need to be taken into consideration and as a result control is passed to step 324 where a settling period for these components is timed out. The power amplifier may be inhibited from providing an output in this period (by cutting off its input for example and/or switching off the amplifiers 202/204 in FIG. 5 or the output of the amplifier 12 in FIG. 1) as the signal it outputs may be corrupted and could, temporarily (for the duration of the gain switching), lead to degradation of other radio system parameters. From step 324 control passes to step 326 where a further settling period for the transmit amplifier 12 and the power amplifier 14 is timed out. If the step 322 determines that a change in operating region within the amplifier has not occurred then control is passed directly to step 326.

From step 326 control is passed to step 328 where the output power is measured. Then control passes to step 330 where the measured power is compared with the demanded transmit power to estimate a suitable correction in amplifier gain. This correction is passed to the ILUT 60 in the form of an updated target power which the ILUT converts to a gain setting. During this correction phase the ILUT is prohibited from changing power amplifier gain range in order not to invalidate the correction by moving to a different power amplifier region whose exact gain has not been measured yet.

From step 330 control passes to step 332 where a measurement of the actual output power is made again which can be used to provide a more accurate output power reading, e.g. for the DBB when operating in synchronized mode and uses the last measurement as a basis for the next request. The measurement at step 332 can be done over an extended time period, as defined by a parameter t which may specify an integration period in time or by reference to a default integration period. Control is then returned to step 300.

Returning to step 302, if it is determined that a transition into the measurement window 170 is not occurring as a result of the requested power change then control is passed to step 340. Step 340 tests whether the requested power change represents a change occurring solely within region 170. If it is, then control is passed to step 320, otherwise control is passed to step 350.

Step 350 checks to see if the transmit power change requested at step 300 will cause a transition from regime 170 where the power detector can be used to take a measurement to regime 150 where it can not be used. If such a transition occurs then control is passed to step 352, otherwise control is passed to step 360.

Step 352 causes the look up table to be accessed to look up the parameters for operation at an intermediate value corresponding to the threshold 160 such that the low power open loop gain error can be measured at step 356 after allowing the amplifier time to settle at step 354. Once the gain error had been measured a corrected power (taking account of the requested power and the error) is calculated, looked up and applied at step 358. Control then passes to step 300. Optionally steps equivalent to steps 322 and 324 may be included between steps 352 and 354. As an alternative, the measurement of the gain error during the transitioning from regime 170 into regime 150 can be omitted by omitting steps 356 and 358. In such a case, step 352 sets the output power to the requested power immediately and gain control can be performed solely in response to the base station.

Returning to step 350, if it is determined that the power control step occurs solely within regime 150, then control is passed to step 360 which looks up the requested power change from the look up table and applies the change to the amplifier, control is then returned to step 300 after a settling period 362.

It should be noted that some transmit power changes can be enacted by changes in the digital baseband, changes in the power amplifier or a combination of these approaches. In general, if a change can be made solely in the digital base band then this is the preferred way of making the change as it causes less perturbation to the power amplifier's operation.

It is thus possible to provide a system which can very quickly estimate the radio transmitter gain by virtue of detecting signals at the output of the power amplifier and comparing them with the corresponding signals provided to the input of the amplifier and up-conversion chain. This gain can then be mapped to power by virtue of a translation using a single coefficient, optionally for each gain range, which is measured during a room temperature characterization stage in order to convert an internal estimate of transmit power to the externally measured estimate of transmit power. Finally the running average of transmit power, as measured with respect to full-scale, that the digital baseband processor keeps as part of the encoding process provides the final part of the key for converting a knowledge of the nature of the transmit signal, and amplifier gain, into a reliable estimate of amplifier transmit power.

The invention claimed is:

1. A transmit power control system, comprising:
   an output power estimator for estimating a transmitted power of a transmit signal path comprising two or more amplifiers; and
   a transmit power controller responsive to the output power estimator and arranged to compare this with a requested power in order to calculate a target power which takes account of errors within the transmit power control system, and to vary a gain of the amplifiers in the transmit signal path so as to reduce an error between the transmitted power of the transmit signal path and the requested power;
   wherein a ratio of input signal amplitude and a down-converted portion of a transmitted signal are compared, so as to form an estimate of amplifier gain, and this is combined with an estimate of long term average power in the input signal so as to form the estimate of the transmitted power.

2. A transmit power control system as claimed in claim 1, in which the power estimator compares time aligned versions of an input signal and a transmitted signal so as to determine the transmitted power.

3. A transmit power control system as claimed in claim 2, in which the power estimator compares amplitudes of the input signal and the transmitted signal after down conversion to estimate the gain of the amplifiers.

4. A transmit power control system as claimed in claim 3, in which the power estimator is further responsive to at least one of an estimate of baseband signal power, gain in a signal detection path, and signal power target to an analog to digital converter in the detection path, and the target power, in order to estimate the transmitted power.

5. A transmit power control system as claimed in claim 1, further comprising an interpolating lookup table, and wherein the transmit power controller calculates a target power value, and this is provided to the interpolating lookup table which interpolates gain control settings for the amplifier.

6. A transmit power control system as claimed in claim 1, in which a portion of the transmitted signal is mixed with a local oscillator signal so as to form a down converted signal which is amplified by a variable gain amplifier and then converted to a digital signal by an analog to digital converter, and wherein gain changes at the variable gain amplifier can be inhibited if a change in the transmit power is below a change threshold.

7. A transmit power control system as claimed in claim 1, in which when the transmitted power is below a transmit power threshold the output power estimator is not active, and the transmit power controller is responsive to a power change request issued by a base station.

8. A transmit power control system as claimed in claim 7, in which when the transmitted power changes so as to cross the transmit power threshold the transmit power controller seeks to estimate an open loop power error and uses this in the calculation of a power target.

9. A transmit power control system as claimed in claim 8, in which when a change in the transmitted power causes the transmitted power to increase from below the transmit power threshold to above the transmit power threshold the transmit power controller makes the change in two steps, such that at a first step it sets the transmitted power to a value at or slightly higher than the transmit power threshold such that the open loop power error can be estimated, and in a second step it uses the open loop power error as part of the target power calculation such that the open loop error is not suddenly removed.

10. A transmit power control system as claimed in claim 1, in which the transmit power controller is adapted to control settings for at least one of a signal amplifier, a power amplifier and digital to analog converters for controlling supply voltage to or bias current in a power amplifier so as to vary a gain of the or each amplifier.

11. A transmit power control system as claimed in claim 1, further comprising a digital baseband processor, and wherein the digital baseband processor reads back a measurement of gain or of transmitted signal power in order to calculate a subsequent requested power value based on a next transmit power control command issued by a base station.

12. A transmit power control system as claimed in claim 5, in which the lookup table is arranged to provide control values for at least one small signal amplifier and a power amplifier, and wherein the lookup table is divided into output power ranges, each range defined by a base gain and a rate of change of gain with respect to output power.

13. A transmit power controller as claimed in claim 1 in which when the transmitted power changes so as to cross a threshold from a region where the transmit power is sufficiently large for the output power estimator to estimate the transmit power of the transmitter to a region where the output power estimator is unable to estimate the transmit power the transmit power controller makes the change in two steps, such that in a first step it sets the transmitted power at or slightly higher than the threshold such that an open loop power error can be estimated, and in a second step it uses the open loop power error as part of the target power calculation.

14. A code division multiple access communications device including a transmit power control system as claimed in claim 1.

15. A method of controlling a transmitted power of a mobile device operating in a CDMA or WCDMA mode, the method comprising the steps of:
    comparing time aligned versions of a baseband or intermediate signal with a down-converted portion of a transmitted signal so as to form an estimate of transmitted power, and using this estimate to adjust the transmitted power towards a target value within a power switching period of the CDMA or WCDMA slot;
    wherein a ratio of input signal amplitude and the down-converted portion of the transmitted signal are compared, so as to form an estimate of amplifier gain, and this is combined with an estimate of long term average power in the input signal so as to form an estimate of the transmitted power.

16. A transmit power control system, comprising:
- an output power estimator for estimating a transmitted power of a transmit signal path comprising two or more amplifiers; and
- a transmit power controller responsive to the output power estimator and arranged to compare this with a requested power in order to calculate a target power which takes account of errors within the transmit power control system, and to vary a gain of the amplifiers in the transmit signal path so as to reduce an error between the transmitted power of the transmit signal path and the requested power;
- wherein when a change in the transmitted power causes the transmitted power to increase from below a transmit power threshold to above the transmit power threshold the transmit power controller makes the change in two steps, such that at a first step it sets the transmitted power to a value at or slightly higher than the transmit power threshold such that an open loop power error can be estimated, and in a second step it uses the open loop power error as part of the target power calculation such that the open loop error is not suddenly removed.

17. A transmit power control system as claimed in claim 16, in which when the transmitted power is below the transmit power threshold the output power estimator is not active, and the transmit power controller is responsive to a power change request issued by a base station.

18. A transmit power control system, comprising:
- an output power estimator for estimating a transmitted power of a transmit signal path comprising two or more amplifiers;
- a transmit power controller responsive to the output power estimator and arranged to compare this with a requested power in order to calculate a target power which takes account of errors within the transmit power control system, and to vary a gain of the amplifiers in the transmit signal path so as to reduce an error between the transmitted power of the transmit signal path and the requested power; and
- a lookup table is arranged to provide control values for at least one small signal amplifier and a power amplifier, and wherein the lookup table is divided into output power ranges, each range defined by a base gain and a rate of change of gain with respect to output power.

19. A transmit power control system as claimed in claim 18, wherein the transmit power controller calculates a target power value, and this is provided to the lookup table which interpolates gain control settings for the amplifiers.

* * * * *